US012353144B2

(12) United States Patent
Sasame et al.

(10) Patent No.: US 12,353,144 B2
(45) Date of Patent: Jul. 8, 2025

(54) CHARGING DEVICE, PROCESS CARTRIDGE, AND IMAGE FORMING APPARATUS

(71) Applicant: CANON KABUSHIKI KAISHA, Tokyo (JP)

(72) Inventors: Hiroki Sasame, Tokyo (JP); Naoki Fuei, Kanagawa (JP); Tomoo Akizuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/630,172

(22) Filed: Apr. 9, 2024

(65) Prior Publication Data

US 2024/0385549 A1 Nov. 21, 2024

(51) Int. Cl.
*G03G 15/02* (2006.01)

(52) U.S. Cl.
CPC ..... *G03G 15/0233* (2013.01); *G03G 15/0225* (2013.01)

(58) Field of Classification Search
CPC ........................ G03G 15/0233; G03G 15/0225
See application file for complete search history.

(56) References Cited

U.S. PATENT DOCUMENTS

| | | | | |
|---|---|---|---|---|
| 6,029,029 A * | 2/2000 | Danzuka | G03G 15/0225 399/9 |
| 7,593,670 B2 | 9/2009 | Matsuda et al. | |
| 8,494,404 B2 | 7/2013 | Takagi et al. | |
| 2004/0228648 A1* | 11/2004 | Yanagida | G03G 15/0225 399/100 |
| 2010/0098453 A1* | 4/2010 | Goebel | G03G 15/0225 399/100 |
| 2012/0082475 A1* | 4/2012 | Kawai | G03G 15/0225 399/176 |

FOREIGN PATENT DOCUMENTS

| | | |
|---|---|---|
| JP | 5-297690 A | 11/1993 |
| JP | 2007-79376 A | 3/2007 |
| JP | 2007-240899 A | 9/2007 |
| JP | 2008-96823 A | 4/2008 |
| JP | 2011-203594 A | 10/2011 |
| JP | 4856974 B2 | 1/2012 |
| JP | 2016075888 A | 5/2016 |

* cited by examiner

*Primary Examiner* — Sandra Brase
(74) *Attorney, Agent, or Firm* — VENABLE LLP

(57) ABSTRACT

A charging device has: a charging member that charges an image bearing member; and a cleaning member that is pressed against the charging member, and that is rubbed against a surface of the charging member by rotating the charging member. The cleaning member includes at least a first layer that contains roughening particles and that comes into contact with the charging member. The Martens hardness of the first layer is higher than that of the surface of the charging member. The roughening particles have a Mohs hardness similar to or higher than that of a component of highest Mohs hardness in toner adhered to the surface of the charging member.

12 Claims, 7 Drawing Sheets

CHARGING DEVICE, PROCESS CARTRIDGE, AND IMAGE FORMING APPARATUS

BACKGROUND OF THE INVENTION

Field of the Invention

The present invention relates to a charging device, to a process cartridge, and to an image forming apparatus.

Description of the Related Art

Electrophotographic image forming apparatuses conventionally rely on a process cartridge system in which a photosensitive drum and a process means that acts on the photosensitive drum are integrated into a cartridge which is attachable/detachable to/from the image forming apparatus. Also developing apparatuses configured in the form of cartridges have similarly found their way into practical use. Such process cartridge systems allow the user to service the apparatus himself/herself, which results in significantly enhanced operability.

One generally known means for uniformly charging a photosensitive drum is a method (so-called contact charging) that involves causing a conductive rubber roller (hereafter referred to as a charging roller) to rotate while in contact with the photosensitive drum. This method for charging a photosensitive drum using a charging roller is advantageous in that less ozone is generated as compared with charging methods relying on corona discharge. On the other hand, a very small amount of toner, of for instance a charge control agent or external additive contained in the toner, remains on the photosensitive drum even after cleaning of untransferred toner on the photosensitive drum by a cleaning means. In a contact charging method, thus, a residue on the photosensitive drum that has failed to be cleaned by the cleaning means may adhere to the charging roller. In this case defective charging may occur in that the photosensitive drum cannot be charged to a desired potential.

Japanese Patent Application Publication No. H05-297690 (1993-297690) discloses thus a configuration in which a cleaning roller is used as a cleaning member of a charging roller. Further, Japanese Patent No. 4856974 discloses a configuration in which a cleaning sheet for instance made up of a polyimide film is used as a cleaning member of a charging roller.

SUMMARY OF THE INVENTION

The configuration disclosed in Japanese Patent Application Publication No. H05-297690 using a cleaning roller however, incurs the high cost of the cleaning member, coupled with the need for a supporting member so as to make the cleaning member rotatable, which translates into a larger charging device.

The configuration disclosed in Japanese Patent No. 4856974 relying on a cleaning sheet allows simplifying and reducing the size of the apparatus. However, the effect of suppressing soiling of a charging roller may be insufficient in cases of substantial amount of residual toner on the photosensitive drum after cleaning, or substantial amount of deposits of for instance a charge control agent or external additive contained in the toner. Given the increasingly longer life of image forming apparatuses and process cartridges in recent years, even slight instances of faulty cleaning may thus lead to charging roller contamination over long periods of time, giving rise to image defects.

It is thus an object of the present invention, arrived at in view of the above considerations, to provide a charging device that allows suppressing soiling of a charging roller, while relying on a simple configuration.

The present invention provides a charging device comprising:

a charging member configured to charge an image bearing member; and a cleaning member configured to be pressed against the charging member, and be rubbed against a surface of the charging member by rotating the charging member, wherein the cleaning member includes at least a first layer that contains roughening particles and that comes into contact with the charging member;

the Martens hardness of the first layer is higher than that of the surface of the charging member; and the roughening particles have a Mohs hardness similar to or higher than that of a component of highest Mohs hardness in toner adhered to the surface of the charging member.

The present invention succeeds in providing a charging device that allows suppressing soiling of a charging roller, while relying on a simple configuration.

Further features of the present invention will become apparent from the following description of exemplary embodiments with reference to the attached drawings.

DESCRIPTION OF THE EMBODIMENTS

Preferred embodiments of the present invention will be explained in detail below on the basis of examples, with reference to accompanying drawings. Unless otherwise noted, the dimensions, materials, shapes, relative arrangements and so forth of the constituent components described in the embodiments are not meant to limit the scope of the present invention to the foregoing alone. Unless otherwise specified, the materials, shapes and so forth of members having been explained once in the disclosure that follows are identical, in a later explanation, to those in the initial explanation. Known features and known techniques in the technical field in question can be adopted in configurations and processes that are not particularly illustrated or recited. Also, recurrent explanations may be omitted.

Embodiment 1

In the present embodiment a method will be explained in which the hardness of particles that coat a surface layer of a sheet member, as a cleaning sheet member for a charging roller, is set to be similar to or higher than the hardness of a material such as a charge control agent or an external additive contained in the toner, to thereby suppress the occurrence of image defects caused by defective charging. A concrete explanation follows next, with reference to accompanying drawings, on an embodiment of the present invention, in the form of a charging device, and a process cartridge and an image forming apparatus that utilize the charging device.

Overall Configuration of Image Forming Apparatus

Figure 1:
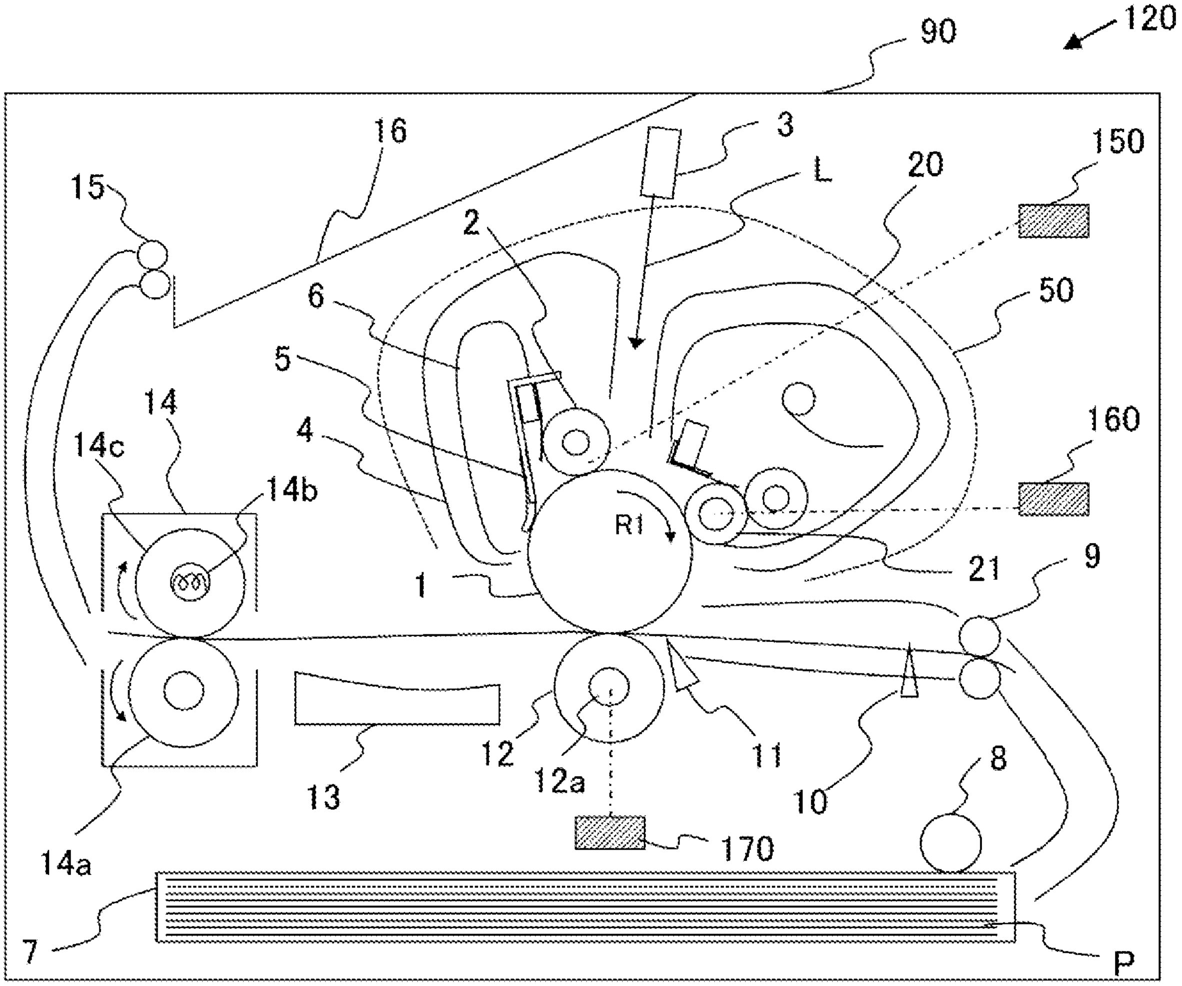
FIG. 1 is a schematic diagram of the entirety of an image forming apparatus according to Embodiment 1.

The overall configuration of an image forming apparatus 120 according to the present embodiment will be explained schematically with reference to FIG. 1. FIG. 1 is an explanatory diagram of the overall configuration of a monochrome laser printer, which is one implementation of the image forming apparatus 120.

At the bottom of an image forming apparatus body 90 there is disposed a paper feed cassette 7 that accommodates a recording material P such as paper. Along a transport path of the recording material P there are sequentially disposed a paper feed roller 8, a transport roller pair 9, a top sensor 10, a pre-transfer guide 11, a transfer roller 12, a transport guide 13, a fixing apparatus 14, a paper discharge roller 15, and a paper discharge tray 16. A process cartridge 50 is disposed so that the transfer roller 12 and a photosensitive drum 1 are in contact with each other.

The photosensitive drum 1, which is rotatably supported by the image forming apparatus body 90, is rotationally driven by a drive motor 180 in the direction of arrow R1, at a process speed of 250 mm/sec (peripheral speed). The charging roller 2 as a charging device, an exposure device 3, a developing unit 20, and a cleaning device 5 are sequentially disposed around the photosensitive drum 1, along the rotation direction of the photosensitive drum 1.

Image Formation Operation

Figure 2:
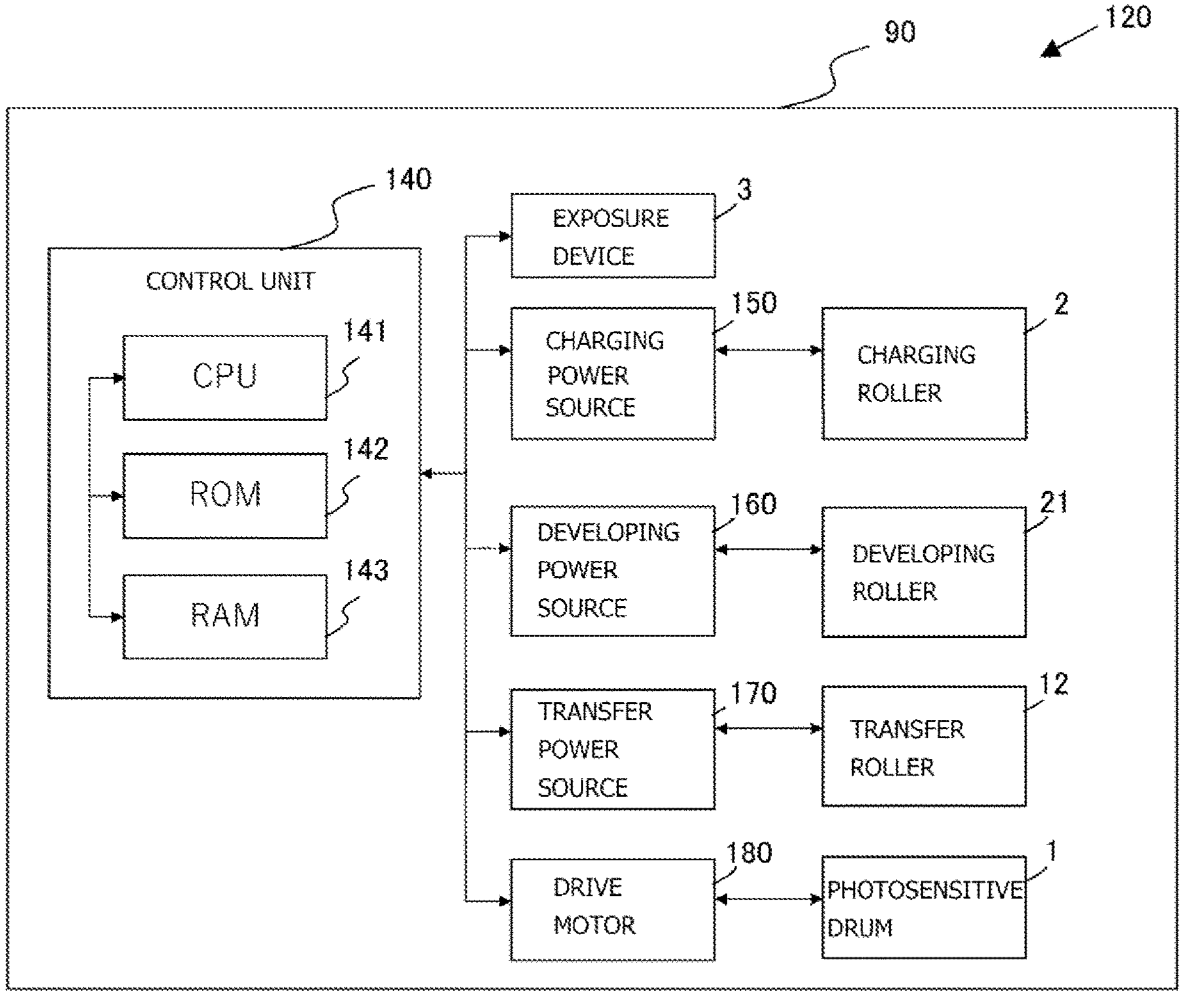
FIG. 2 is a schematic control block diagram of the image forming apparatus according to Embodiment 1.

An image formation operation by the image forming apparatus 120 configured as described above will be explained next. FIG. 2 is a schematic block diagram illustrating a control mode of main units of the image forming apparatus 120. In the present embodiment, a control unit 140 (control circuit) as a control means, provided in the apparatus body 90 of the image forming apparatus 120, comprehensively controls the operations of the various units of the image forming apparatus 120. The control unit 140 includes a CPU 141 as an arithmetic control means, and for instance a ROM 142 and a RAM 143, as storage means. The ROM 142 stores programs that are executed by the CPU 141, as well as various data. The RAM 143 is used as the working memory of the CPU 141. A charging power source 150, a developing power source 160, a transfer power source 170, the drive motor 180, the exposure device 3 and so forth are connected to the control unit 140.

The photosensitive drum 1, which is rotationally driven in the direction of arrow R1 by the drive motor 180, becomes uniformly charged to a predetermined polarity and to a predetermined potential by the charging roller 2 as a charging device. The photosensitive drum 1 used in the present embodiment is a negatively charged organic photosensitive member (OPC: Organic Photoconductor) having an outer diameter of φ24 mm. The charging roller 2, which relies on a contact DC charging scheme, comes into contact with the photosensitive drum 1, at a predetermined pressure, forming a charging nip. The DC voltage that is to be applied is set to a value such that a potential difference between the surface of the photosensitive drum 1 and a charging bias that is applied to the charging roller 2 is equal to or higher than a discharge start voltage; herein a DC voltage of −1100 V is specifically applied as the charging bias. In this case the surface of the photosensitive drum 1 becomes uniformly contact-charged to a charging potential (dark area potential) of Vd=−550 V.

When the surface of the thus charged photosensitive drum 1 is image-exposed by a laser beam L based on image information, by the exposure device 3 such as a laser scanner, the charge on the exposed portion is eliminated, and an electrostatic latent image becomes formed as a result. Laser output is adjusted in the present embodiment so that V1=−100 V holds, where V1 is the potential upon uniform charging of the entire surface of the photosensitive drum 1 by the laser beam L. A developer is supplied next, by the developing unit 20, to the electrostatic latent image formed on the photosensitive drum 1. In this case a magnetic toner of negative polarity is used as the developer. Developing can be accomplished using a developing roller 21, as a developing member, onto which there is applied a developing bias (Vdc) of −300 V from the developing power source 160 as a voltage application means for applying voltage to the developing member.

Sheets of the recording material P, which are stored in the paper feed cassette 7, are fed one by one by the paper feed roller 8, are transported by the transport roller pair 9, and are transported, while guided along the pre-transfer guide 11, to a transfer nip formed by the photosensitive drum 1 and the transfer roller 12. A transfer bias of reverse polarity to that of the charging polarity of the toner is applied from the transfer power source 170 to a core 12*a* of the transfer roller 12, whereupon the resulting toner image on the photosensitive drum 1 becomes transferred to a predetermined position on the recording material P. The transfer roller 12 used in the present embodiment has an outer diameter of φ14 mm, a core diameter of φ5 mm, an elastic layer thickness of 4.5 mm and a hardness of 30° (Asker C hardness). Herein SUS is used in the core, and a mixed rubber material of NBR and epichlorohydrin is used in the elastic layer.

The recording material P that supports, on the surface thereof, an unfixed toner image by a transfer portion is transported to the fixing apparatus 14 along the transport guide 13. The fixing apparatus 14, which includes a pressure roller 14*a*, and a fixing roller 14*c* having a built-in heater 14*b*, applies heat and pressure to the passing recording material P, to thereby fix the unfixed toner image. After fixing of the toner image, the recording material P is discharged, by a paper discharge roller 15, onto the paper discharge tray 16 at the top of the apparatus body 90. Meanwhile, toner remaining on the surface of the photosensitive drum 1 without having been transferred to the recording material P (untransferred toner) is recovered by the cleaning device 5 into a waste toner container 6. Images can be formed, one by one, through repetition of the above operations.

Configuration of Process Cartridge

Figure 3:
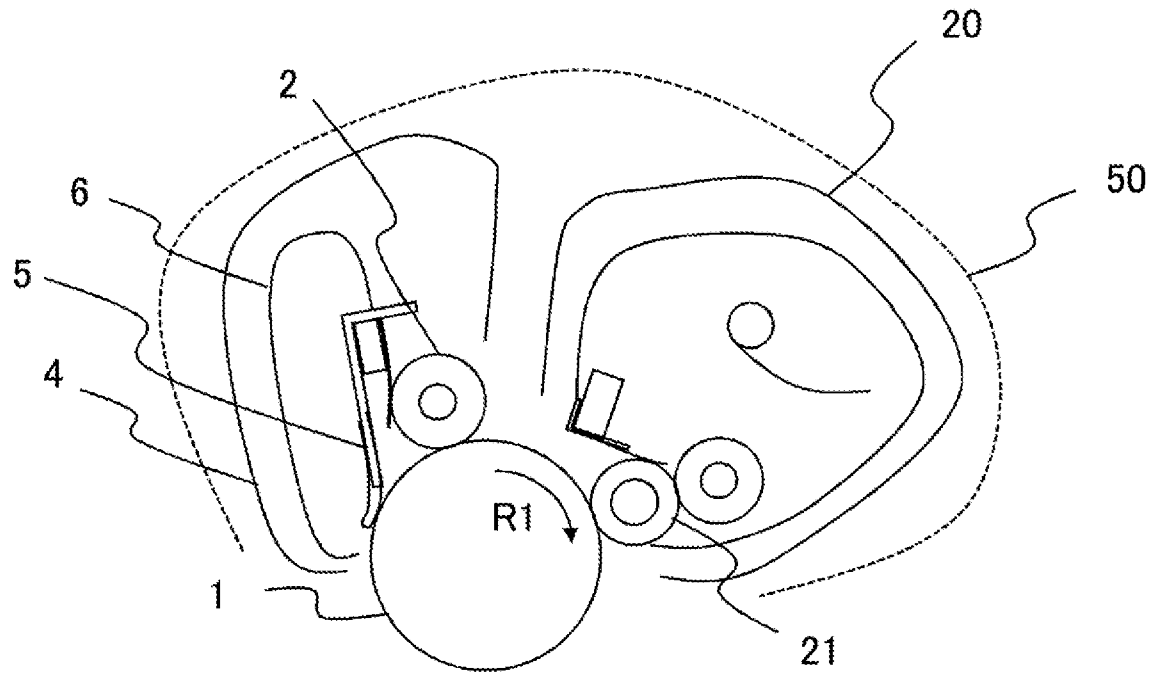
FIG. 3 is a schematic diagram of a process cartridge of Embodiment 1.
Figure 4A:
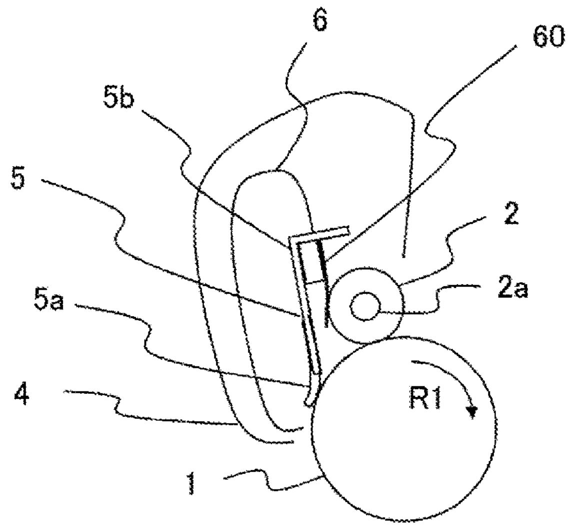
FIG. 4A and FIG. 4B are schematic diagrams of a photosensitive drum unit and a developing unit of Embodiment 1.
Figure 4B:
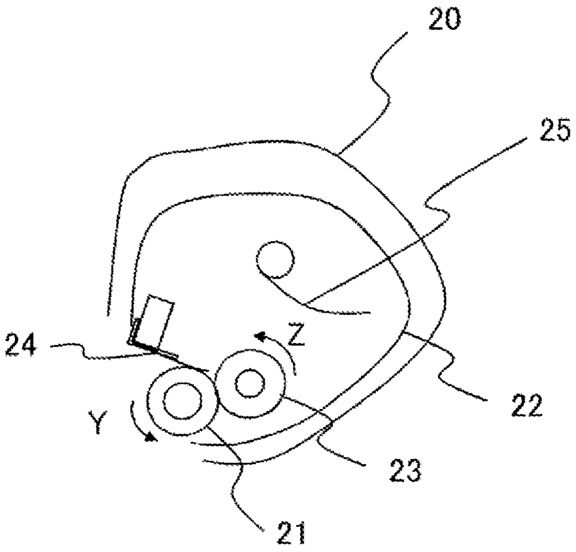

The process cartridge 50 of the present embodiment will be explained in detail next with reference to FIG. 3, FIG. 4A and FIG. 4B. FIG. 3 illustrates the entirety of a process cartridge. FIG. 4A illustrates details of a photosensitive drum unit 4. FIG. 4B illustrates details of the developing unit 20. As illustrated in FIG. 3, the process cartridge 50 includes: the photosensitive drum unit 4 provided with the photosensitive drum 1, the charging roller 2 as a charging device, the cleaning device 5; and a developing unit 20 having a developing roller 21 for developing the electrostatic latent image on the photosensitive drum 1.

In the photosensitive drum unit 4 as illustrated in FIG. 4A, the charging roller 2 for charging uniformly the surface of the photosensitive drum 1, and the cleaning device 5 for removing toner remaining on the photosensitive drum, are disposed, on the circumference of the photosensitive drum 1.

The charging roller 2 is formed out of a conductive elastic layer made up of NBR rubber and having a thickness of about 2 mm, on a core 2*a* having a diameter φ6 mm, and a release layer made up of an acrylic resin and having a thickness of about 5 μm, on the conductive elastic layer. The thickness of the surface layer can be measured by cutting a cross section of the charging member using a sharp knife, and observing the cross section under an optical microscope or electron microscope. As a high resistance layer of the charging roller 2 there may be used, besides urethane rubber, also an acrylic resin, a nylon resin, a fluororesin or the like. The charging roller 2 is disposed substantially parallelly to the photosensitive drum 1. Both ends of the core are rotatably supported by conductive support members (not shown) that are in turn urged so as to move, towards the photosensitive drum 1, by respective spring members (not shown). The charging roller 2 becomes pressed as a result against the photosensitive drum 1, at a predetermined pressing force, thereby forming a charging nip, such that the charging roller 2 rotates accompanying the rotation of the photosensitive drum 1.

The image forming apparatus body 90 includes the charging power source 150 as a voltage application means for applying a charging bias to the charging roller 2. In the present embodiment DC voltage is applied from this charging power source 150 to the core 2*a*. In the present embodiment the charging roller 2 rotates as driven by the photosensitive drum 1, but some means may be resorted for rotationally driving the charging roller 2. In that case a difference in peripheral speeds may be created through rotation of the charging roller 2 and the photosensitive drum 1 at dissimilar rotational speeds.

The cleaning device 5 of the present embodiment has a so-called blade cleaning configuration in which a rubber blade 5*a* is provided at the tip of a support member 5*b* made of SUS. Residual toner having been removed from the surface of the photosensitive drum 1 by the cleaning device 5 is stored in the waste toner container 6. The charging roller 2 may have adhered thereto a small amount of toner remaining on the photosensitive drum 1 without having been removed by the cleaning device 5, as well as for instance a charge control agent or an external additive contained in the toner. In the present embodiment, therefore the photosensitive drum unit 4 has a sheet member 60 for the purpose of removing deposits from the surface of the charging roller 2.

As illustrated in FIG. 4B, in the developing unit 20 there are disposed the developing roller 21 that rotates in the direction of arrow Y while in contact with the photosensitive drum 1, a toner supply roller 23 that rotates in the direction of arrow Z while in contact with the developing roller 21, a developing blade 24, and a toner container 22 in which toner is accommodated. Further, a toner transport means 25 for stirring the toner accommodated in the toner container 22 and for transporting the toner to the toner supply roller 23, is provided within the toner container 22.

Upon transport of the toner stored in the toner transport means 25 to the toner supply roller 23 at the time of development, the toner supply roller 23, which rotates in the direction of arrow Z, slides over the developing roller 21 that rotates in the direction of arrow Y, as a result of which the toner on the toner supply roller 23 becomes supplied as a result to the developing roller 21, to be supported thereon. The toner supported on the developing roller 21 comes into contact with the developing blade 24, accompanying the rotation of the developing roller 21, whereupon the developing blade 24 imparts charge to the toner, to form a thin toner layer having a predetermined thickness. The thin toner layer formed on the developing roller 21 becomes then transported to a developing portion at which the photosensitive drum 1 and the developing roller 21 come into contact with each other; developing is performed at this developing portion in accordance with the electrostatic latent image formed on the surface of the photosensitive drum 1, by DC developing bias applied from the developing power source 160 to the developing roller 21.

The toner remaining on the surface of the developing roller 21 without contributing to development is returned into the toner container 22 accompanying the rotation of the developing roller 21, and is stripped off the developing roller 21 at a rubbing portion with the toner supply roller 23, to be recovered. The recovered toner is stirred and mixed with the residual toner by the toner transport means 25. In a contact developing scheme in which development is performed through contact of photosensitive drum 1 and the developing roller 21, preferably the photosensitive drum 1 is a rigid body and the developing roller 21 used therewith is a roller having an elastic body. For instance a solid rubber single layer, or a resin-coated solid rubber layer is used as this elastic body there, in consideration of charge-providing performance towards the toner. The toner supply roller 23 is an elastic roller made up of a core portion and a foamed member such as a sponge.

Toner

For instance a styrene-acrylic resin, a styrene-methacrylic copolymer resin or polyester resin is used as the binder resin of the toner. For instance carbon black or an iron oxide such as magnetite, maghemite or ferrite, as well as other known pigments and dyes, can be used herein as a colorant of the toner.

Other external additives may be added to the toner, as needed, for the purpose of imparting appropriate powder characteristics. Such external additives may be for instance fine resin particles and inorganic fine powders that function as a charge control agent, an anti-caking agent, a release agent during fixing in the fixing apparatus, a lubricant or an abrasive. Examples of charge control agents include silica, alumina, titanium oxide, hydrotalcite compounds and di-tert-butylsalicylic acid aluminum complexes. Examples of release agents include hydrocarbon waxes such as low molecular weight polyethylene, low molecular weight polypropylene, microcrystalline wax and paraffin wax. Examples of the lubricant include for instance polyfluoroethylene fine particles, zinc stearate fine particles and polyvinylidene fluoride fine particles. Examples of abrasives include cerium oxide fine particles, silicon carbide fine particles and strontium titanate fine particles.

The external additive used in the present embodiment was added in an amount of 1.5 parts by mass of silica, 0.1 parts by mass of a hydrotalcite compound, or 0.1 parts by mass of strontium titanate, relative to 100 parts by mass of toner.

Deposits on Charging Roller

As described above, the toner remaining on the photosensitive drum 1 is cleaned and removed by the cleaning device 5. Even after cleaning of the photosensitive drum 1, however, a very small amount of toner, or for instance of the charge control agent or external additive contained in the toner still remains on the photosensitive drum 1. Part of such residue after cleaning adheres to the charging roller 2 and accumulates thereon. An analysis of the deposits accumulated on the charging roller 2 in the present embodiment reveals instances of electrostatic adhesion of silica which is a charge control agent, or hydrotalcite or strontium titanate which are external additives, and instances of physical sticking of these charge control agents and external additives while mixed with the resin components of the toner.

Conventional Cleaning Sheet Member

A sheet member conventionally used as a cleaning member for the charging roller 2 will be explained next. According to Japanese Patent No. 4856974, the work functions of the charging roller 2, a polyimide sheet and silica satisfy the relationship "sheet member>silica>charging roller", and accordingly the polyimide sheet becomes readily charged to negative polarity, whereas the charging roller becomes readily charged to positive polarity, with respect to silica, and as a result it becomes possible to suppress the occurrence of defective charging, in the form of vertical streaks, by virtue of the fact that silica is repelled by the polyimide sheet but is attracted towards the charging roller 2.

However, the occurrence of image defects derived for instance from a charge control agent or an external additive may in some instances fail to be suppressed in conventional sheet members. This is arguably because in a case where the work function of deposits other than silica cannot obey a desired relationship, or in a case where the amount of deposits is large, deposits end up accumulating, on the charging roller 2, by becoming physically compacted on account of the contact pressure between the photosensitive drum 1 and the charging roller 2. In a case where for instance the charge control agent or external additive accumulates on the charging roller 2, the photosensitive drum 1 may fail to be charged to a desired potential, which translates into significant impairment of image quality.

Further, electrostatic migration from the charging roller 2 towards the photosensitive drum 1 is more difficult in a case where the attachment force of deposits is large, on account of the above-described inter-mixing of the charge control agent or external additive with the resin component of the toner. In this case as well the photosensitive drum 1 cannot be charged to a desired potential, and image quality is significantly impaired.

Cleaning Sheet Member of Present Embodiment

The cleaning sheet member of the present embodiment is a cleaning sheet that allows suppressing the occurrence of image defects caused by defective charging even under conditions where deposits would accumulate on the charging roller, in the case of a polyimide sheet, such as that above. As a result of exhaustive studies the inventors found that by prescribing the hardness of particles that coat the surface layer of a sheet member to be similar to or higher than the hardness of materials such as a charge control agent or external additive contained in the toner, there are elicited an effect in that stuck deposits are loosened, irrespective of the work function of the materials, and an effect in that the deposits on the charging roller 2 are dispersed uniformly, and found that the occurrence of image defects caused by defective charging can be suppressed as a result.

Details of the cleaning sheet member will be explained next. As the sheet member 60 of the present embodiment a sheet member 60 will be explained which is characterized in that a surface layer thereof has a given roughness, and a hard material is used in the surface layer. The surface layer of the sheet member 60 in the present embodiment includes at least a layer that is formed on the surface of the side that forms the contact surface with the charging roller 2.

Firstly, the feature of using a hard material in the surface layer of the sheet member 60 will be explained in detail. Many of the materials used as charge control agents and external additives are sufficiently harder than materials that are utilized in a conventional sheet member 60, such as polyimides and polyphenylene sulfide (PPS). For instance on the Mohs hardness scale, which is a general hardness index, inorganic substances such as silica (silicon dioxide) and strontium titanate exhibit a Mohs hardness from 5 to 6, whereas crystalline plastics such as polyimides and PPS, which are organic substances, are soft, exhibiting a Mohs hardness from 1 to 2. Therefore, the deposits on the charging roller 2 are harder than the sheet member 60, and accordingly the above-described effect of loosening stuck deposits or the effect of uniformly dispersing the deposits on the charging roller 2 failed to be achieved.

In the sheet member 60 of the present embodiment, in consequence, a hard material is used in the surface layer of the sheet member. Herein the sheet member 60 has a base layer (second layer) and a surface layer (first layer), the base layer being made up of a flexible material (Mohs hardness: 1), as in a conventional sheet member, whereas a hard material (Mohs hardness: 7) is used in the surface layer. The pushing pressure of the sheet member 60 against the charging roller 2 can be readily controlled by using thus a flexible material in the base layer. For instance there may be used a single-layer sheet member 60 made up of a hard material, but in such a case the thickness of the sheet member 60 must be very small, in order to control the pushing pressure on the charging roller 2. In that case the very thin sheet member 60, formed to be very thin, constitutes the first layer but in the form of a very hard thin-film sheet, and as a result that sheet is for instance difficult to process and breaks readily; the sheet is therefore difficult to procure and to use well. In the present embodiment polyethylene terephthalate (PET) was used as the base layer of the sheet member 60, with the thickness of the base layer in the range from 25 to 150 μm. The thickness of the sheet member 60 is not limited thereto, and may be modified depending on the material that is selected, so long as the sheet member 60 can be pressed against the charging roller 2 at a desired contact pressure.

The surface layer of the sheet member 60 of the present embodiment will be explained next in detail. In anticipation of being pressed against the charging roller 2, the sheet member 60 preferably has flexibility, as pointed out above. Hence, the flexibility of the sheet member 60 needs to be maintained, while using a hard material in the surface layer. In the sheet member 60 of the present embodiment, therefore, a PET layer as the base layer is coated with particles of a hard material as the surface layer. In this case the hardness of the particles that coat the surface layer is preferably similar to or higher than the hardness of materials such as a charge control agent or an external additive contained in the toner. Silica, which is ordinarily widely used for instance as a charge control agent or an external additive, has a Mohs hardness of 5, and titanium of 5 to 5.5, while the general Mohs hardness of strontium titanate or the like is 6; therefore, the Mohs hardness of particles that coat the surface layer of the sheet member 60 is preferably 6 or higher. The general new Mohs hardness (corrected Mohs hardness) of silica (silicon dioxide) is 7, and the new Mohs hardness of for instance strontium titanate is 6, and hence the new Mohs hardness of particles that coat the surface layer of the sheet member 60 is preferably 7 or higher. For instance silicon dioxide, magnesium oxide, cerium oxide, zirconium oxide, chromium oxide, aluminum oxide, silicon carbide, boron carbide, diamond or the like can be used as the particles that coat the surface layer of the sheet member 60.

The surface roughness of the sheet member 60 will be explained in detail next. The occurrence of image defects caused by defective charging can be suppressed by virtue of the fact that the sheet member 60 exhibits a given roughness on the contact surface with the charging roller 2, as described above. Specifically, the surface roughness of the sheet member 60, as an arithmetic-mean roughness Ra, is preferably from 0.18 μm to 2.41 μm. The effect of loosening stuck deposits cannot be achieved if the surface roughness is too small. In a case by contrast where the surface roughness is excessively high, the degree of loosening of stuck deposits exhibits significant variability, and as a result deposits cannot be dispersed uniformly. In the present embodiment, therefore, the surface roughness is set to lie in the above ranges, in order to bring out both the effect of loosening stuck deposits and the effect of uniformly dispersing the deposits on the charging roller 2.

Figure 5:
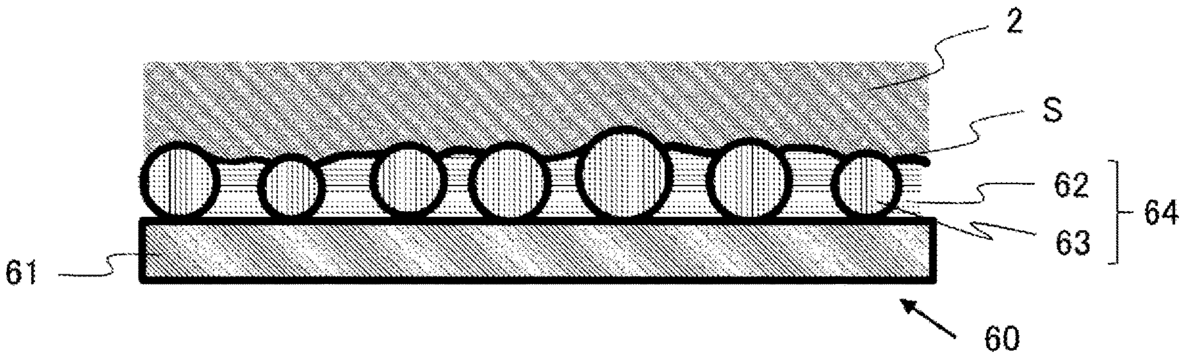
FIG. 5 is a schematic diagram of a sheet member of Embodiment 1.

FIG. 5 illustrates and explains a cross-sectional diagram of the sheet member 60 of the present embodiment. The sheet member 60 has a surface layer 64 resulting from uniform coating of a flexible base layer 61 with particles 63, for instance by way of an adhesive 62 such as a polymeric adhesive. As a result, a hard material can be disposed on a contact surface S, of the surface layer 64 of the sheet member 60, with the charging roller 2, while the flexibility of the sheet member 60 is preserved as it is. The surface roughness of the sheet member 60 (roughness of the contact surface S) can be adjusted on the basis of the particle diameter of the particles that coat the surface layer 64 of the sheet member 60. The particle diameter of the coating particles is not particularly limited, but the particles that are used have preferably a particle diameter from 0.3 μm to 12.0 μm, for the purpose of achieving stably the desired surface roughness Ra.

Method for Pressing Sheet Member Against Charging Roller

Figure 6:
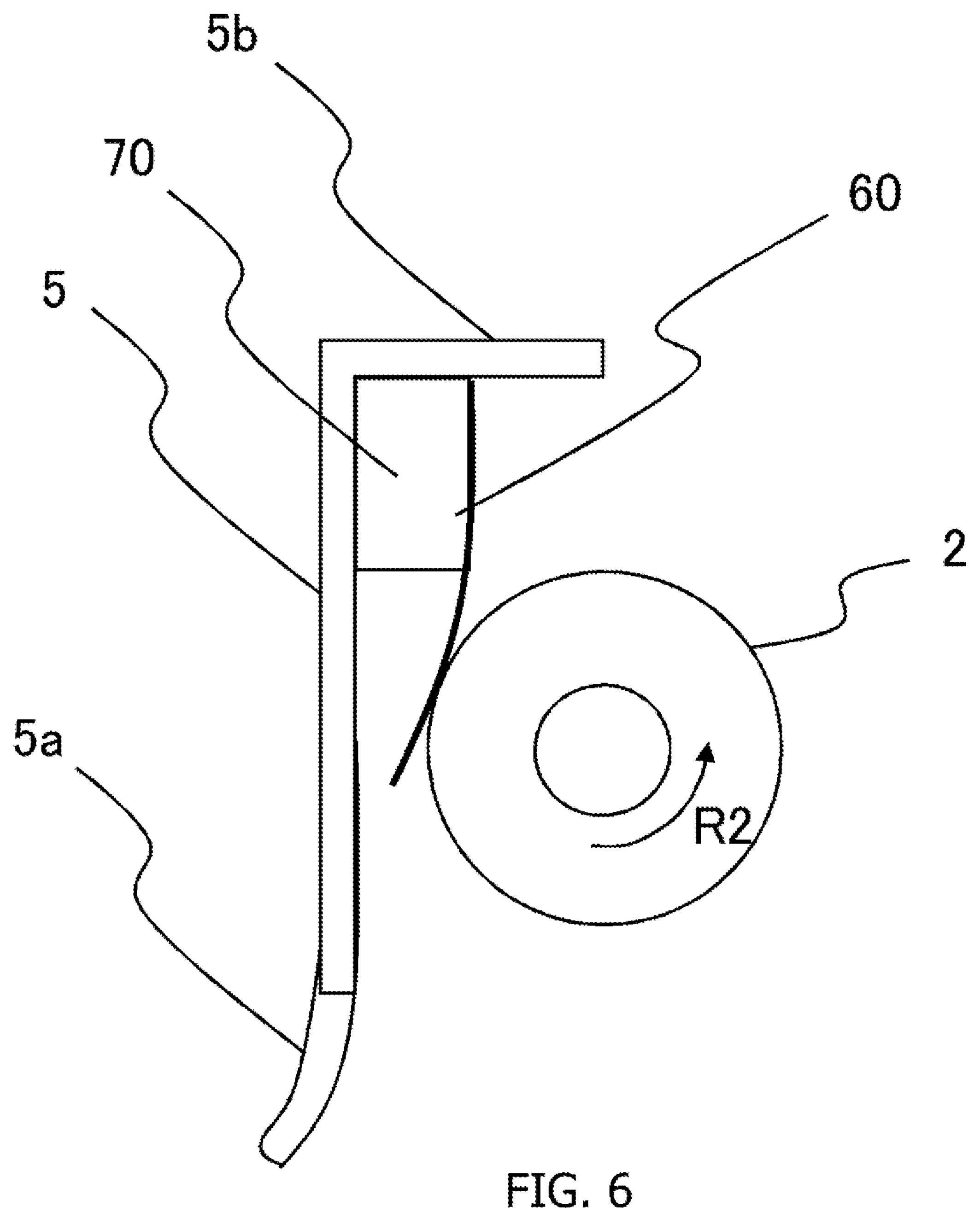
FIG. 6 is a schematic diagram illustrating a method for attaching a sheet member in Embodiment 1.

A method for pressing the sheet member 60 against the charging roller 2 will be explained with reference to FIG. 6 and FIG. 7. The sheet member 60 has substantially the same length dimension as the length dimension, along the rotation axis, of the elastic layer portion of the charging roller 2. The upper longitudinal side portion of the sheet member is supported by being affixed, to a sheet member affixing stand 70, by way of double-sided tape, in such a manner that no waviness arises. The sheet member affixing stand 70 is fixedly supported on the support member **5*b* of the cleaning blade of the cleaning device 5. The sheet member 60 is brought into contact with the charging roller 2, in the rotation direction R2 thereof, at a moderate pressing force, so that the sheet member 60 curves forwardly. The sheet member 60 is disposed in such a manner that there is no gap between the charging roller 2 and the sheet member 60, even partially, at the contact portion therebetween. As a result, the sheet member 60 rubs against the rotating charging roller 2, to thereby loosen, and at the same time uniformly disperse, deposits adhered to charging roller 2**.

Figure 7:
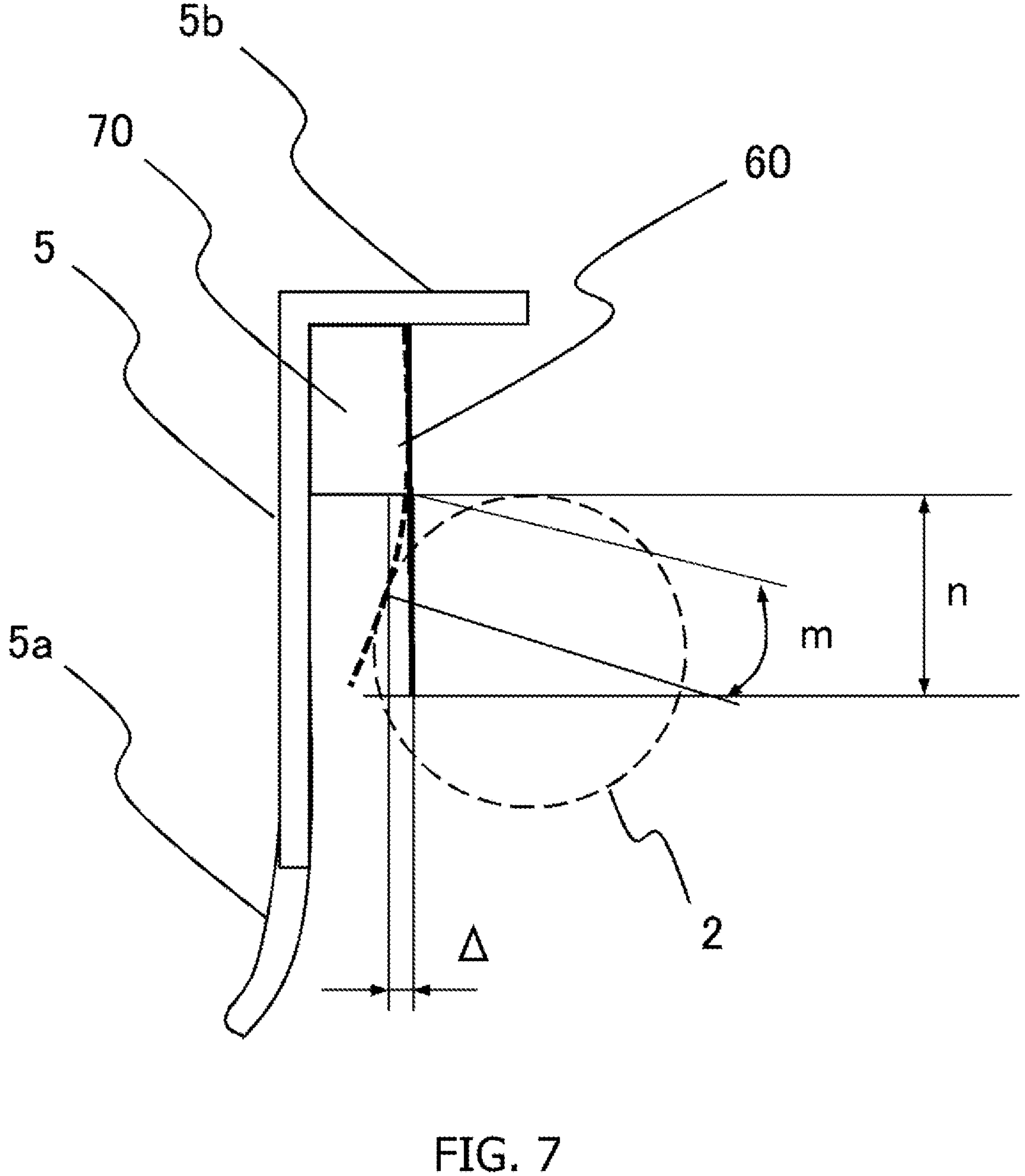
FIG. 7 is a schematic diagram illustrating a method for pressing a sheet member against a charging roller in Embodiment 1.

A free length n, a contact length m, and a penetration degree Δ were defined in the sheet member 60, as illustrated in FIG. 7. The free length n is a portion of the sheet member 60 that is not affixed to and supported by the sheet member affixing stand 70. The contact length m is the distance, within the free length n from the end of the sheet member affixing stand 70 to the contact point with the charging roller 2. The penetration degree Δ is the distance between a point at which the sheet member 60 is present when the charging roller 2 is not in contact with sheet member 60, and a point at which there is present the sheet member having deformed on account of contact with the charging roller 2, in a direction perpendicular to the direction in which the sheet member 60 extends, referred to the above contact point. In the present embodiment, the free length n was set to range from 6 to 10 mm, the contact length m with the charging roller 2 was set to range from 4 to 8 mm, and the penetration degree Δ was set to range from 1 to 2 mm. These values are to be established as appropriate depending on apparatus configuration, size, materials and desired performance.

Surface Layer Hardness of Sheet Member and Surface Layer Hardness of Charging Roller The hardness of the surface layer of the sheet member 60 in the present embodiment is higher than the hardness of the surface layer of the charging roller 2. The hardness of the surface layer of the sheet member 60 and the hardness of the surface layer of the charging roller 2 were ascertained through a measurement of the Martens hardness HM ($N/m^2$), on the basis of ISO 14577, using a microhardness meter (product name: Picodentor HM500, by Helmut Fischer GmbH). The rationale for a comparison versus Martens hardness is that Mohs hardness yields a value of 1 in both the sheet member 60 and the charging roller 2, and thus the difference in hardness is an index that cannot be expressed as a numerical value. The Martens hardness HM is measured while under a test load. The Martens hardness HM is worked out from a value that obtained, on the basis of load and indentation depth, by increasing the test load, if possible after a default load has been reached. This measurement involves specifically the following.

The Martens hardness HM is defined, by expression (1), as the quotient of applied test force (F) by the surface area of indentation A(h). This indentation surface area A(h) is calculated from the indentation depth (h) of the indenter. The indenter that is used herein is a diamond-made Vickers indenter of square pyramid type.

$$HM=F/As(h)=F/(26.43\times h_2) \quad (1)$$

The measurement was performed at a testing temperature/humidity of 23° C./50% RH, with indenter settings that included maximum indentation depth $h_2$: 2 μm, maximum test load Fmax: 100 mN, and test time 30 s.

The Martens hardness HM calculated in accordance with the above measurement method is about 200 $N/mm^2$ for the surface layer 64 of the sheet member 60 and is about 1.0 $N/mm^2$ for the surface layer of the charging roller 2; the sheet member 60 is thus sufficiently hard. Zirconium oxide, which is an example of particles used as particles that coat the surface layer 64 of the sheet member 60 has a Martens hardness HM of about 3000 $N/mm^2$, and aluminum oxide has a Martens hardness HM of about 9000 $N/mm^2$; zirconium oxide and aluminum oxide exhibit thus, as indicated also by the Mohs hardness thereof, sufficiently higher hardness than those of the surface layers of the charging roller 2 and the sheet member 60.

Evaluation Experiment 1

Evaluation experiment 1, Evaluation experiment 2 and Evaluation experiment 3 were carried out for the purpose of ascertaining the effects of the present embodiment. As Evaluation experiment 1 first, an explanation follows on evaluation results observed concerning the effect on the surface roughness Ra of the sheet member 60. In Evaluation experiment 1, a wrapping film sheet (by the 3M Company) was used as the sheet member 60. This wrapping film sheet is made up of a base layer and a surface layer, such that polyethylene terephthalate (PET) having a thickness of 75 μm being used as the base layer, and the surface layer is uniformly coated with aluminum oxide particles using a polymeric adhesive. Aluminum oxide has a general Mohs hardness of 9 and a new Mohs hardness of 12. Ten types of wrapping film sheets, namely Sheets 1 to 10 below, were prepared that had dissimilar particle diameters of the aluminum oxide particles that coat the surface layer.

As given in Table 1, seven types of sheets, namely sheets 1 to 7, were prepared as the sheet member 60 of the present embodiment. Sheets 1 to 7 result from application of aluminum oxide particles having particle diameters of 0.3 μm (#10000), 1.0 μm (#8000), 2.0 μm (#6000), 3.0 μm (#4000), 5 μm (#3000), 9 μm (#2000), 12 μm (#1200), respectively, on the surface layer of the sheet. Three additional types of sheets, namely Sheets 8, 9 and 10, were prepared as comparative examples. Sheets 8 and 9 result from coating the surface layer with aluminum oxide particles having particle diameters of 15 μm (#1000) and 30 μm (#600), respectively. Sheet 10 is obtained by processing Sheet 1. Specifically, two Sheets 1 were prepared and were continuously rubbed against each other, such that the surfaces coated with the aluminum oxide particles facing each other, to yield Sheet 10.

The arithmetic-mean roughness Ra (μm, JIS B 0601) as the surface roughness of Sheets 1 to 10 was measured using a surface roughness measuring device (product name: Surfcorder, by Kosaka Laboratory Ltd.). The measurement conditions that were set included: evaluation length 4 mm, cutoff value 0.8 mm, feed rate 0.1 mm/s. Table 1 sets out measurement results of particle diameter and surface roughness Ra of each of Sheets 1 to 9.

TABLE 1

| | | Particle diameter [μm] | Ra [μm] |
|---|---|---|---|
| Present embodiment | Sheet 1 | 0.3 | 0.18 |
| | Sheet 2 | 1 | 0.33 |
| | Sheet 3 | 2 | 0.73 |
| | Sheet 4 | 3 | 2.01 |
| | Sheet 5 | 5 | 2.41 |
| | Sheet 6 | 9 | 1.67 |
| | Sheet 7 | 12 | 2.01 |
| Comparative example 1 | Sheet 8 | 15 | 2.61 |
| | Sheet 9 | 30 | 3.92 |
| | Sheet 10 | 0.3 (processed) | 0.08 |

As Table 1 reveals, the particle diameter of the particles with which the surface layer is coated and the surface roughness Ra of the sheet member 60 are not necessarily correlated with each other. In a comparison between Sheet 5 and Sheet 6, for instance, the particle diameter of the particles applied to the surface layer of Sheet 6 is larger, whereas the Ra of the sheet surface layer of Sheet 5 is larger. Such phenomena can occur because the surface roughness Ra of the sheet member is determined by the degree of protrusion of the particles 63 beyond the adhesive 62.

Details on evaluation conditions will be explained next. Paper of A4 size, Red Label (by Canon Inc.) having a basis weight of 80 g/m$^2$ was used as the paper for printing. The process cartridge that was prepared could output 5500 prints at a print percentage of 4%. Process cartridges fitted with the sheet members 60 of Sheets 1 to 7 were prepared, and a comparative evaluation was performed.

As a comparative evaluation, it was checked whether image defects derived from defective charging occurred or not at the end of the life of the process cartridge. Firstly, there were printed 5000 images of 4 mm-wide horizontal lines arrayed at 96 mm intervals, to bring the process cartridge to a life-end state thereof. Image evaluation was performed with a view to ascertaining the effects, of each sheet member 60, in terms of suppressing adhesion of for instance the charge control agent or external additive to the charging roller 2. As an image evaluation there were printed 10 halftone images, and the occurrence or absence of image defects derived from defective charging was checked. Image evaluation was performed after every 500 prints. The results of Evaluation experiment 1 are given in Table 2.

TABLE 2

| | | Particle diameter [μm] | Ra [μm] | Image defects caused by defective charging |
|---|---|---|---|---|
| Present embodiment | Sheet 1 | 0.3 | 0.18 | No |
| | Sheet 2 | 1 | 0.33 | No |
| | Sheet 3 | 2 | 0.73 | No |
| | Sheet 4 | 3 | 2.01 | No |
| | Sheet 5 | 5 | 2.41 | No |
| | Sheet 6 | 9 | 1.67 | No |
| | Sheet 7 | 12 | 2.01 | No |
| Comparative example 1 | Sheet 8 | 15 | 2.61 | Occurs at 4500 prints |
| | Sheet 9 | 30 | 3.92 | Occurs at 3000 prints |
| | Sheet 10 | 0.3 (processed) | 0.08 | Occurs at 3000 prints |

As Table 2 reveals, in the process cartridges fitted with Sheets 1 to 7 of the present embodiment no image defects caused by defective charging occurred, and good images were obtained. By contrast, in the process cartridges fitted with Sheets 8, 9 and 10 as comparative examples, image defects caused by defective charging occurred at 4500, 3000 and 3000 prints, respectively. Upon checking of the surface of the charging roller 2, accumulation of deposits was found to have been suppressed in the process cartridges fitted with Sheets 1 to 7 of the present embodiment. By contrast, accumulation of streak-like deposits was observed in the process cartridges fitted with Sheets 8, 9 and 10 as comparative examples.

Observation results of the charging roller 2 and sheets in the evaluation experiments, as well as results that led to the present invention, ostensibly revealed that although stuck deposits can be loosened, the degree of variability in deposit loosening is significant, in a case where surface roughness Ra is excessive, as in Sheets 8 and 9, and accordingly deposits cannot be dispersed uniformly. Meanwhile, if the surface roughness Ra is excessively small, as in the case of Sheet 10, the effect of loosening stuck deposits is not achieved in the first place. It is considered that both the effect of loosening stuck deposits and the effect of dispersing deposits uniformly can be elicited, in combination, within the range of surface roughness Ra of Sheets 1 to 7 according to the present embodiment. In the evaluation experiment no significant effect differences were observed in the surface roughness range of Sheets 1 to 7. From the above it follows that the surface roughness Ra of the sheet member 60 is preferably from 0.18 μm to 2.41 μm.

Evaluation Experiment 2

Evaluation experiment 2 will be explained next. In Evaluation experiment 2 there was ascertained the effect derived from the hardness of the surface layer material of the sheet member 60. In Evaluation experiment 2 the following four types of sheets C, D, E and F were prepared as the sheet member 60 of the present embodiment. Two types of Sheets A and B below were prepared as sheet members of comparative examples. Herein only sheet A was a single-layer sheet made up of a polyimide, such that the sheet thickness was 75 μm, and the surface layer was imparted with a predetermined roughness. Sheets B, C, D, E and F are made up of a base layer and a surface layer, with polyethylene terephthalate (PET) having a thickness of 75 μm being used as the base layer, and with the surface layer being coated with respective particles using for instance a polymeric adhesive. Sheets A, E and F were produced using commercially available products, and sheets B, C and D were produced in accordance with the method below. Specifically, a polyethylene terephthalate resin was used as the binder resin, methyl ethyl ketone was used as the solvent, and the resulting product was mixed with the coating particles, with defoaming, followed by bar coating onto a base material, to yield a respective sheet. The surface roughness Ra of the sheet members was set to lie in the range from 0.18 μm to 2.41 μm. As the base material there can be used, besides polyethylene terephthalate, for instance also polybutylene terephthalate, polyethylene naphthalate, polyethylene, polypropylene, polycarbonate, polyvinyl chloride, polyvinylidene chloride, polystyrene, polyacrylonitrile, ABS resin, nylon or the like. As a linker resin there can be used, besides polybutylene terephthalate resin, also for instance a urethane resin or a butyral resin. Besides methyl ethyl ketone, also for instance toluene, xylene, methyl isobutyl ketone, ethyl acetate or butyl acetate can be used as the solvent. Other than bar coating, for instance also instance spray coating, roll coating, knife coating, die coating or the like can be resorted to as the coating method.

Sheet A (Comparative Example)

Material: polyimide (Mohs hardness of surface layer material: 1, new Mohs hardness: 1)
Surface layer Ra: 0.52 μm
(by UBE Corporation, product name: Upilex)

Sheet B (Comparative Example)

Coating particles: calcium carbonate (Mohs hardness of coating particles that are the surface layer material: 3, new Mohs hardness: 3)
Particle diameter: 1.0 μm
Surface layer Ra: 0.55 μm

Sheet C

Coating particles: zirconium oxide (Mohs hardness of coating particles that are the surface layer material: 7, new Mohs hardness: 7)
Particle diameter: 1.0 μm
Surface layer Ra: 0.50 μm

Sheet D

Coating particles: chromium oxide (Mohs hardness of coating particles that are the surface layer material: 6, new Mohs hardness: 7)

Particle diameter: 1.0 μm

Surface layer Ra: 0.41 μm

Sheet E

Coating particles: aluminum oxide (Mohs hardness of coating particles that are the surface layer material: 9, new Mohs hardness: 12)

Particle diameter: 1 μm

Surface layer Ra: 0.33 μm (by the 3M Company, product name: Wrapping film #8000)

Sheet F

Coating particles: silicon carbide (Mohs hardness of coating particles that are the surface layer material: 9, new Mohs hardness: 13)

Particle diameter: 1 μm

Surface layer Ra: 0.21 μm (by Sankyo Rikagaku Co., Ltd., product name: Wrapping film #8000)

Evaluation conditions will be explained in detail next. Paper of A4 size, Red Label (by Canon Inc.) having a basis weight of 80 g/m$^2$ was used as the paper for printing. The process cartridge that was prepared could output 5500 prints at a print percentage of 4%. Two types of toner were prepared for use in the process cartridge. The first type that was used was a toner (Toner 1), being the toner in the present embodiment, and resulting from adding 1.5 parts by mass of silica, 0.1 parts by mass of a hydrotalcite compound, and 0.1 parts by mass of strontium titanate, relative to 100 parts by mass of toner. The second type that was used was a toner (Toner 2) resulting from adding 1.8 parts by mass of silica and 0.1 parts by mass of a hydrotalcite compound, relative to 100 parts by mass of toner.

Each sheet member 60 of Sheets A, B, C, D, E and F was fitted, process cartridges using Toner 1 and Toner 2 were prepared, and a comparative evaluation was performed. As a comparative evaluation it was checked whether image defects derived from defective charging occurred or not at the end of the life of the process cartridge. Firstly, there were printed 5000 images of 4 mm-wide horizontal lines arrayed at 96 mm intervals, to bring the process cartridge to a life-end state thereof. Image evaluation was performed with a view to ascertaining the effects, of each sheet member 60, in terms of suppressing adhesion of for instance the charge control agent or external additive to the charging roller 2. As an image evaluation there were printed 10 halftone images, and the occurrence or absence of image defects derived from defective charging was checked.

Table 3 illustrates the results of the evaluation experiment. Table 3 sets out the general Mohs hardness and new Mohs hardness of the surface layer material used in each sheet member 60, along with occurrence or absence of image defects caused by defective charging.

TABLE 3

| | | Surface layer material | Mohs hardness of surface layer material | New Mohs hardness of surface layer material | Image defects caused by defective charging in cartridge using Toner 1 | Image defects caused by defective charging in cartridge using Toner 2 |
|---|---|---|---|---|---|---|
| Comparative example 1 | Sheet A | No | 1 | 1 | Yes | Yes |
| Comparative example 2 | Sheet B | Calcium carbonate | 3 | 3 | Yes | Yes |
| Present embodiment | Sheet C | Zirconium oxide | 7 | 7 | No | No |
| | Sheet D | Chromium oxide | 6 | 7 | No(*) | No |
| | Sheet E | Aluminum oxide | 9 | 12 | No | No |
| | Sheet F | Silicon carbide | 9 | 13 | No | No |

As Table 3 reveals, there occurred no image defects caused by defective charging, and good images were obtained, in the process cartridges fitted with Sheets C, D, E and F of the present embodiment. By contrast, image defects caused by defective charging occurred in the process cartridges fitted with Sheets A and B of Comparative example 1. A check of the surface of the charging roller 2 at this time revealed substantial accumulation of deposits in process cartridges fitted with Sheets A and B, whereas accumulation of deposits was suppressed in Sheets C, D, E and F. Slight accumulation of deposits occurred however in the structure of Sheet D in a cartridge that used Toner 1. A check of the contact surface of the sheet member 60 with the charging roller 2 after the evaluation experiment revealed observable wear of the surface layers of Sheets A and B, but no observable wear on the surface layers of Sheets C, D, E and F.

Arguably, the underlying reason for the observed wear on the surface layers of Sheets A and B is that the surface layers of the sheets was scraped by deposits on the surface of the charging roller 2, due to the fact that the hardness of materials such as the charge control agent or external additive contained in the toner is higher than the hardness of the particles with which the surface layer of the sheet member was coated. Further, the ostensible reason for the slight accumulation of deposits in the configuration of sheet D in the cartridge that utilized Toner 1 is deemed to lie on the difficulty in achieving the effect of loosening stuck deposits on the charging roller 2, due to the presence of the harder external additive (strontium titanate: Mohs hardness of 6) that was used in Toner 1.

From the above it follows that the occurrence of image defects caused by defective charging can be suppressed by prescribing the hardness of particles with which the surface layer of the sheet member 60 is coated to be similar to or higher than the hardness of materials, such as a charge control agent or external additive, contained in the toner. Herein the surface roughness Ra of the sheet member 60 is preferably from 0.18 μm to 2.41 μm.

Embodiment 2

An explanation follows next in the present embodiment of a method for suppressing image defects caused by defective charging, such that, under conditions where the durability of the sheet member 60 is even more necessary, for instance in the case of prolonged life of the process cartridge explained in Embodiment 1, the hardness of the particles that coat the surface layer of a sheet member, as a cleaning sheet member of the charging roller, is set to be higher than the hardness of materials such as the charge control agent or external additive contained in the toner. The configuration of the image forming apparatus is identical to that in Embodiment 1. Therefore, a recurrent explanation of portions other than dissimilar portions will be omitted herein.

The effect derived from the hardness of the surface material of the sheet member 60 was ascertained under conditions where more durability of the sheet member 60 is required, such as in a case of prolonged life of the process cartridge. Evaluation experiment 3 will be explained below.

Evaluation Experiment 3

In Evaluation experiment 3 there were prepared four types of sheet members similar to Sheets C, D, E and F used in Evaluation experiment 2 described above. Sheets E and F were prepared as the sheet member 60 of the present embodiment, and sheets C and D were prepared as comparative examples.

Paper of A4 size, Red Label (by Canon Inc.) having a basis weight of 80 g/m$^2$ was used as the paper for printing. The process cartridge that was prepared could output 10500 prints at a print percentage of 4%. Process cartridges each fitted with sheet members 60 of sheets C, D, E and F were prepared, and a comparative evaluation was performed. The toner used was Toner 1 of Embodiment 1.

As a comparative evaluation it was checked whether image defects derived from defective charging occurred or not at the end of the life of the process cartridge. Firstly, there were printed 10000 images of 4 mm-wide horizontal lines arrayed at 96 mm intervals, to bring the process cartridge to a life-end state thereof. Image evaluation was performed with a view to ascertaining the effects, of each sheet member 60, in terms of suppressing adhesion of for instance the charge control agent or external additive to the charging roller 2. As an image evaluation there were printed 10 halftone images, and the occurrence or absence of image defects derived from defective charging was checked.

Table 4 illustrates the results of the evaluation experiment. Table 4 sets out the general Mohs hardness and new Mohs hardness of the surface layer material used in each sheet member 60, along with occurrence or absence of image defects caused by defective charging.

TABLE 4

| | | Surface layer material | Mohs hardness of surface layer material | New Mohs hardness of surface layer material | Image defects caused by defective charging |
|---|---|---|---|---|---|
| Comparative example 3 | Sheet C | Zirconium oxide | 7 | 7 | Yes |
| | Sheet D | Chromium oxide | 6 | 7 | Yes |
| Present embodiment | Sheet E | Aluminum oxide | 9 | 12 | No |
| | Sheet F | Silicon carbide | 9 | 13 | No |

As Table 4 reveals, there occurred no image defects caused by defective charging, and good images were obtained, in the process cartridges fitted with Sheets E and F of the present embodiment. By contrast, image defects caused by defective charging occurred in the process cartridges fitted with sheets C and D of Comparative example 3. A check of the contact surface of the sheet member 60 with the charging roller 2 after the evaluation experiment revealed substantial accumulation of deposits in process cartridges fitted with Sheets C and D, whereas accumulation of deposits was suppressed in Sheets E and F. A check of the contact surface of the sheet member 60 with the charging roller 2 after the evaluation experiment revealed observable wear of the surface layers of Sheets C and D, but no observable wear on the surface layers of Sheets E and F. This is because greater wear resistance was required from the sheets, given the longer period of use as compared with Embodiment 1.

That is, it is considered that although an effect of loosening deposits stuck on the charging roller 2 is elicited by prescribing the hardness of the particles to be similar to or higher than the hardness of materials such as for instance the charge control agent and external additive contained in the toner, wear and deterioration may however occur, depending on the usage period, when the values of hardness are close to each other.

Under conditions where more durability of the sheet member 60 is required, such as in a case of prolonged life of the process cartridge is longer, the occurrence of image defects caused by defective charging can be suppressed, as described above, by prescribing the hardness of the particles that coat the surface layer of the sheet member 60 to be higher than the hardness of materials such as the charge control agent or external additive contained in the toner. Herein, the surface layer material has preferably a general Mohs hardness of 7 or higher and a new Mohs hardness of 8 or higher.

As described above, the present embodiment allows suppressing the occurrence of image defects caused by defective charging, by prescribing the hardness of the particles that coat the surface layer of the sheet member 60, as the cleaning sheet member of the charging roller 2, to be higher than the hardness of materials such as the charge control agent or external additive contained in the toner. A good image free of image defects can be obtained as a result. The surface roughness Ra of the sheet member 60 is herein preferably from 0.18 μm to 2.41 μm. Preferably, the surface layer material has a general Mohs hardness of 6 or higher, and a new Mohs hardness of 7 or higher. Under conditions where more durability of the sheet member 60 is required, such as in a case where the life of the process cartridge is longer, the surface layer material has preferably a general Mohs hardness of 7 or higher and a new Mohs hardness of 8 or higher.

Although suitably ranges of values of Mohs hardness and of surface roughness of the surface layer material can be adopted as explained above, it is preferable to adopt well-balanced values of Mohs hardness and surface roughness, within appropriate ranges, depending on the specifications of the process cartridge (for instance the toner used, the life of the cartridge, and the charging roller).

Others

The charging roller 2 including the sheet member 60 described above has been explained in the form of a process cartridge that is removably attachable to the image forming apparatus body 90, but the present invention is not limited thereto. Similar effects can be achieved also in a process cartridge in which the photosensitive drum unit 4 and the developing unit 20 are independently attachable/detachable to/from the image forming apparatus body 90. Similar effects can likewise be obtained in an image forming apparatus of toner replenishment type in which the process cartridge is integrated with the image forming apparatus.

The image forming apparatus 120 explained above has a monochrome configuration.

However, the constitution of the present invention is not limited thereto, and similar effects can be achieved even when the present invention is used in a color image forming apparatus that prints multiple colors (for instance, the four colors of yellow, magenta, cyan and black) superimposed on each other.

In that case, an intermediate transfer member such as an intermediate transfer belt may be used as a way of transferring images to the recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080262, filed on May 15, 2023, which is hereby incorporated by reference wherein in its entirety.

What is claimed is:

1. A charging device comprising:

a charging member configured to charge an image bearing member; and a cleaning member configured to be pressed against the charging member, and be rubbed against a surface of the charging member by rotating the charging member, wherein:

the cleaning member includes at least a first layer that contains roughening particles and that comes into contact with the charging member;

a Martens hardness of the first layer is higher than that of the surface of the charging member; and the roughening particles have a Mohs hardness similar to or higher than that of a component of highest Mohs hardness in toner adhered to the surface of the charging member.

2. The charging device according to claim 1, wherein the cleaning member has the first layer, and a flexible second layer that supports the first layer.

3. The charging device according to claim 2, wherein the first layer is formed through coating of the second layer with the roughening particles, by way of an adhesive.

4. The charging device according to claim 1, wherein the component of the toner adhered to the surface of the charging member includes an external additive of the toner.

5. The charging device according to claim 1, wherein the roughening particles are a material having a Mohs hardness of 6 or higher.

6. The charging device according to claim 1, wherein the roughening particles are a material having a Mohs hardness of 7 or higher.

7. The charging device according to claim 1, wherein the roughening particles are a material having a new Mohs hardness of 7 or higher.

8. The charging device according to claim 1, wherein the roughening particles are a material having a new Mohs hardness of 8 or higher.

9. The charging device according to claim 1, wherein a surface roughness Ra of the first layer of the cleaning member is from 0.18 μm to 2.41 μm.

10. The charging device according to claim 1, wherein a particle diameter of the roughening particles is from 0.3 μm to 12 μm.

11. A process cartridge comprising:

an image bearing member; and the charging device according to claim 1.

12. An image forming apparatus comprising:

an image bearing member; and the charging device according to claim 1.

* * * * *